(12) United States Patent
Glasenapp et al.

(10) Patent No.: US 9,797,804 B2
(45) Date of Patent: Oct. 24, 2017

(54) METHOD AND SYSTEM FOR DETERMINING THE SPATIAL STRUCTURE OF AN OBJECT

(71) Applicants: Carl Zeiss Vision International GmbH, Aalen (DE); Carl Zeiss AG, Oberkochen (DE)

(72) Inventors: Carsten Glasenapp, Oberkochen (DE); Matthias Hornauer, Laucheeim-Huelen (DE); Adalbert Hanssen, Aalen (DE); Yvonne Schleitzer, Jena (DE); Lars Omlor, Aalen (DE)

(73) Assignees: Carl Zeiss Vision International GmbH, Aalen (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 14/930,489

(22) Filed: Nov. 2, 2015

(65) Prior Publication Data
US 2016/0054196 A1 Feb. 25, 2016

Related U.S. Application Data

(63) Continuation of application No. PCT/EP2014/058859, filed on Apr. 30, 2014.

(30) Foreign Application Priority Data

| May 2, 2013 | (DE) | ........................ 10 2013 208 090 |
| May 2, 2013 | (DE) | ........................ 10 2013 208 091 |
| Sep. 30, 2013 | (DE) | ........................ 10 2013 219 838 |

(51) Int. Cl.
*G01B 9/00* (2006.01)
*G01M 11/02* (2006.01)
(Continued)

(52) U.S. Cl.
CPC ......... *G01M 11/0242* (2013.01); *G01B 11/00* (2013.01); *G01B 11/24* (2013.01);
(Continued)

(58) Field of Classification Search
CPC ............. G01M 11/02; G01M 11/0242; G01M 11/0207; G01M 11/0214; G01M 11/025;
(Continued)

(56) References Cited

U.S. PATENT DOCUMENTS

| 4,312,574 A | 1/1982 | Wilms |
| 4,998,819 A | 3/1991 | Labinger et al. |

(Continued)

FOREIGN PATENT DOCUMENTS

| DE | 10 2005 038 738 A1 | 2/2007 |
| DE | 10 2007 061 375 B3 | 7/2009 |

(Continued)

OTHER PUBLICATIONS

International Preliminary Report on Patentability and Written Opinion of the International Searching Authority dated Nov. 12, 2015 of international application PCT/EP2014/058859 on which this application is based.

(Continued)

*Primary Examiner* — Jamil Ahmed
(74) *Attorney, Agent, or Firm* — Walter Ottesen, P.A.

(57) ABSTRACT

The spatial structure of an optical element is determined. The optical element has a first optically active surface and a second optically active surface. The optical element is arranged in a holding device. The position of a point (P) on the first optically active surface and the position of a point (P') on the second optically active surface are referenced in a coordinate system fixed to the holding device. The topography of the first optically active surface is determined in a coordinate system referenced to the holding device by the (Continued)

position of point (P) and the spatial structure of the optical element is calculated from the topography of the first optically active surface and from a data set as to the topography of the second optically active surface. The data set is referenced to the fixed coordinate system of the holding device by the position of point (P').

22 Claims, 9 Drawing Sheets

(51) Int. Cl.
    *G01B 11/24*      (2006.01)
    *G01B 21/04*      (2006.01)
    *G01B 11/00*      (2006.01)

(52) U.S. Cl.
    CPC .......... *G01B 21/04* (2013.01); *G01M 11/025* (2013.01); *G01M 11/0207* (2013.01); *G01M 11/0214* (2013.01)

(58) Field of Classification Search
    CPC ........ G01M 11/24; G01B 11/00; G01B 11/25; G01B 11/2441; G01B 11/24; G01B 121/04; B24B 49/12
    See application file for complete search history.

(56) References Cited

U.S. PATENT DOCUMENTS

| | | | |
|---|---|---|---|
| 5,392,079 A | 2/1995 | Fedorov et al. | |
| 6,222,621 B1 | 4/2001 | Taguchi | |
| 6,847,441 B2 | 1/2005 | Nakamura et al. | |
| 6,909,498 B2 | 6/2005 | Devie et al. | |
| 7,701,562 B2 | 4/2010 | Nemoto et al. | |
| 8,174,687 B2 | 5/2012 | Boutinon et al. | |
| 8,494,809 B2 | 7/2013 | Esser et al. | |
| 2005/0174566 A1 | 8/2005 | Namiki | |
| 2009/0053465 A1 | 2/2009 | Scherg et al. | |
| 2010/0134789 A1* | 6/2010 | Boutinon | B24B 49/12 356/124 |
| 2010/0231923 A1* | 9/2010 | Ge | G01B 11/2441 356/511 |
| 2010/0309458 A1 | 12/2010 | Ge et al. | |
| 2012/0133957 A1 | 5/2012 | Widman et al. | |
| 2013/0293726 A1 | 11/2013 | Armstrong-Muntner et al. | |

FOREIGN PATENT DOCUMENTS

| | | |
|---|---|---|
| JP | 7-97022 A | 9/1991 |
| JP | 2001-227908 A | 8/2001 |
| JP | 2010-008193 A | 1/2010 |
| WO | 00/31500 A1 | 6/2000 |
| WO | 2007/018118 A1 | 2/2007 |
| WO | 2012/067508 A1 | 5/2012 |

OTHER PUBLICATIONS

International Search Report dated Jul. 16, 2014 of international application PCT/EP2014/058859 on which this application is based.

* cited by examiner

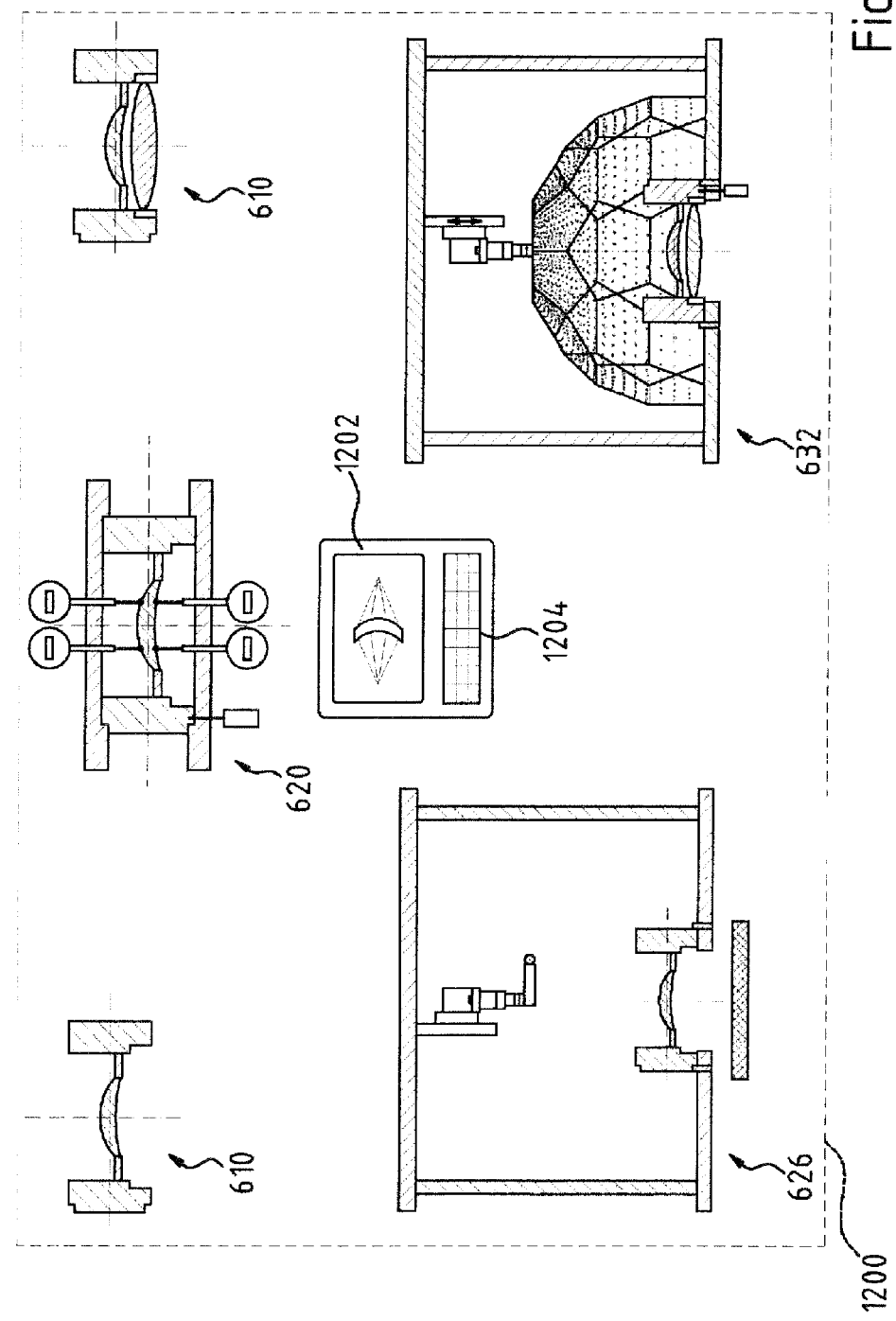

METHOD AND SYSTEM FOR DETERMINING THE SPATIAL STRUCTURE OF AN OBJECT

CROSS REFERENCE TO RELATED APPLICATIONS

This application is a continuation application of international patent application PCT/EP2014/058859, filed Apr. 30, 2014, designating the United States and claiming priority from German applications 10 2013 208 090.5 and 10 2013 208 091.3, both filed May 2, 2013, and 10 2013 219 838.8, filed Sep. 30, 2013, and the entire content of the above applications is incorporated herein by reference.

FIELD OF THE INVENTION

The invention relates to a method for determining the spatial structure of an object, in particular a lens, for example, a spectacle lens, a spectacle lens blank or a spectacle lens semifinished product, the object having a first optically effective surface and a second optically effective surface.

Furthermore, the invention also relates to a system for determining the spatial structure of an object, in particular a lens, for example, a spectacle lens, a spectacle lens blank or a spectacle lens semifinished product, by such a method.

BACKGROUND OF THE INVENTION

In the present case, a lens should be understood to be a glass or plastic body having two optically effective, that is, light-refracting, surfaces situated opposite one another. A lens within the meaning of the invention is, in particular, a spectacle lens configured for insertion into a spectacle frame. In the present case, the term lens also encompasses so-called spectacle lens blanks, that is, a usually preformed material piece for producing a lens in a state before the end of surface processing, and also so-called semifinished products in the form of a lens blank having only one surface processed optically to completion. Such semifinished products are also designated as spectacle lens semifinished products.

In order to determine the spatial structure of objects, it is known, for example, to scan the objects in a coordinate measuring machine with a measuring sensor. In order that the spatial structure of an object can be ascertained in a pinpoint manner and with high accuracy in this way, it is necessary to capture a largest feasible number of measurement points by means of the measuring sensor at the surface of the object.

For the quality control of spectacle lenses in a spectacle lens manufacturing device, therefore, widespread use is made of measuring methods that measure a spectacle lens only at a few places. In order to ascertain the spatial structure and the optical properties of spectacle lenses, the latter are often examined by means of so-called vertex refractometers that measure the optical effect of the spectacle lenses in an arrangement in which light is passed through the spectacle lens (transmission measurement).

SUMMARY OF THE INVENTION

It is an object of the invention to provide a method and a system with which the spatial structure of an object having a first and a second optically effective surface can be determined in a short time and with high accuracy.

Within the meaning of the invention, an optically effective surface of an object is understood to be a surface which reflects light rays in the visible or else invisible spectral range at least partly directionally. Within the meaning of the invention, an optically effective surface is understood to be, in particular, the light-refracting surfaces of a spectacle lens. It should be noted here that optically effective surfaces within the meaning of this invention can be both transparent and specularly reflective for the light.

According to the invention, the object is, for determining the spatial structure of the object, arranged in a holding device. The object is especially a lens, for example, a spectacle lens, a spectacle lens blank or a spectacle lens semifinished product. The object has a first optically effective surface and a second optically effective surface. The position of at least one point, preferably the position of at least three points, on the first optically effective surface and the position of at least one point, preferably the position of at least three points, on the second optically effective surface in a coordinate system that is location-fixed with respect to the holding device are then referenced, that is, determined, in the holding device.

The topography of the first optically effective surface of the object is then ascertained on the basis of the position of the at least one point, preferably on the basis of the position of the at least three points, on the first optically effective surface in a coordinate system that is referenced with respect to the holding device.

Finally, the spatial structure of the object is calculated from the topography of the first optically effective surface and from a data set concerning the topography of the second optically effective surface, the data set being referenced with respect to the location-fixed coordinate system of the holding device on the basis of the position of the at least one point on the second optically effective surface, preferably on the basis of the position of the at least three points on the second optically effective surface.

In order to ascertain the topography of the first optically effective surface, the topography of this surface can be measured, for example, by means of a topography measuring method. However, it is also possible, for ascertaining the topography of this surface, to evaluate a known data set from a data memory having information about this surface.

In order to ascertain the topography of the first optically effective surface by measurement, for example, light from a point light source, preferably from a multiplicity of point light sources, can be provided, the light being reflected at the first optically effective surface, and a first brightness distribution can be detected, which is brought about on an image sensor by the light of the point light sources that is reflected at the first optically effective surface. The topography of the first optically effective surface can then be calculated from the position of the at least one point, preferably from the position of the at least three points, on the first optically effective surface of the object and from the detected first brightness distribution in a coordinate system that is referenced with respect to the holding device. The spatial structure of the object is then calculated from the position—referenced in a coordinate system that is location-fixed with respect to the holding device—of the at least one point, preferably from the position of the at least three known points, on the first and second optically effective surfaces and from the calculated topography of the first optically effective surface and a data set concerning the topography of the second optically effective surface, the data set being referenced with respect to the location-fixed coordinate system of the holding device.

It should be noted, however, that the topography of this surface, as an alternative thereto, can for example also be ascertained by means of point-based or line-based deflectometry, by examination in confocal, in particular chromatically confocal, systems, by means of interferometry, in particular by means of white light interferometry, by means of computed tomography (CT) using visible light or using X-rays, by means of triangulation or else in a tactile measuring method, for instance in a coordinate measuring machine.

The data set concerning the topography of the second optically effective surface can be, for example, a desired data set for this surface or else a data set having measurement data concerning the topography of this surface. This data set, too, can be determined, for example, by means of a topography measuring method indicated above. In particular, it is possible to ascertain the data set concerning the topography of the second optically effective surface, the data set being referenced with respect to the location-fixed coordinate system, by means of light being provided from a multiplicity of point light sources, the light being reflected at the second optically effective surface, by means of a brightness distribution being detected, which is brought about on an image sensor by the light of the point light sources that is reflected at the second optically effective surface, and by means of the topography of the second optically effective surface being calculated from the position of the at least one point, preferably from the position of the at least three points, on the second optically effective surface of the object and from the detected brightness distribution in the coordinate system that is location-fixed with respect to the holding device.

In the present case, the position of a point that is referenced in a coordinate system is understood here to mean that for the point the coordinates of the position are known in the coordinate system.

In order to determine the location- and direction-dependent optical effect of an object, in particular a spectacle lens, a spectacle lens blank or a spectacle lens semifinished product, the object having a first optically effective surface and a second optically effective surface, the spatial structure of the object is determined by the method described above and then the location- and direction-dependent optical effect of the object, that is, the optical transfer function thereof, is calculated from the determined spatial structure and in particular taking account of the refractive index and/or the reflection properties by means of a ray tracing method.

In the present case a ray tracing method is understood here to be a method for determining the optical transfer function of an object in which, for a multiplicity of predefined light rays which proceed from an object and which impinge on the object, the deflection of these light rays on account of the spatial structure and the physical properties of the object is calculated.

The data set containing the topography of the second optically effective surface, the data set being referenced with respect to the location-fixed coordinate system, can also be ascertained by means of light being provided from a multiplicity of point light sources, the light being reflected at the second optically effective surface, by means of a second brightness distribution being detected, which is brought about on an image sensor by the light of the point light sources that is reflected at the second optically effective surface, and by means of the topography of the second optically effective surface being calculated from the position of at least one of the three points on the second optically effective surface of the object and from the detected second brightness distribution in the coordinate system that is location-fixed with respect to the holding device.

For specifying the spatial structure of the object in an object-fixed coordinate system, the coordinate system that is location-fixed with respect to the holding device is preferably referenced with respect to an object-fixed coordinate system.

For this purpose, the coordinate system that is location-fixed with respect to the holding device can be referenced, for example, by ascertaining the position of a marking fitted on the object in the location-fixed coordinate system with respect to the object-fixed coordinate system.

It is also a concept of the invention to ascertain the position of at least one of the known points on the first optically effective surface or on the second optically effective surface in a coordinate system that is location-fixed with respect to the holding device by a thickness measurement of the object. In particular, it is a concept of the invention, for referencing the position of at least one of the known points on the first optically effective surface or the second optically effective surface in a coordinate system that is location-fixed with respect to the holding device, to measure the object by a distance measuring device relative to the holding device. For referencing the position of at least one of the known points on the first optically effective surface or the second optically effective surface in a coordinate system that is location-fixed with respect to the holding device, it is also possible, however, for the object to be accommodated at the at least one point at a ball support in the holding device.

A system according to the invention for determining the spatial structure of an object, in particular a lens, for example, a spectacle lens, a spectacle lens blank or a spectacle lens semifinished product, the object having a first optically effective surface and a second optically effective surface, contains at least one measuring station for measuring the topography and/or the gradient and/or the curvature of the first and/or the second optically effective surface of the object. The system also comprises a holding device for arranging the object in an accommodating region of the at least one measuring station, in which the position of at least one point, better three points, on the first optically effective surface and of at least one point, better three points, on the second optically effective surface of the object is determinable in a coordinate system that is location-fixed with respect to the holding device. In this case, in the measuring station there are a multiplicity of point light sources that provide light which is reflected at the optically effective surface to be measured of an object arranged in the accommodating region. In this case, the measuring station contains at least one camera for detecting a brightness distribution that is brought about on an image sensor by the light of the point light sources that is reflected at the optically effective surface, to be measured. The point light sources of the measuring station are preferably arranged on the lateral surface of a polyhedron.

It is also a concept of the invention to arrange an optical assembly having positive or negative refractive power in the measuring station between the camera and the accommodating region, the optical assembly serving to direct the light of the point light sources to an object arranged in the accommodating region and to feed the light reflected at the object to the camera.

The holding device can hold the object to be measured outside the first and/or second optically effective surface or support the object to be measured at at least one point, preferably at three points, on the first and/or the second optically effective surface.

Preferably, the holding device with an object accommodated therein is arrangeable in the measuring station in a first position, in which the first optically effective surface of the object faces the camera, and in a second position, which is different than the first position and in which the first optically effective surface of the object faces away from the camera.

The system can contain means for referencing a coordinate system that is location-fixed with respect to the holding device with respect to a coordinate system that is location-fixed with respect to the measuring station. In particular, the system can comprise a measuring station having a camera for detecting the position of a marking arranged on the object in a coordinate system that is location-fixed with respect to the measuring station. The system can also contain a measuring station having at least one measuring device for detecting the position of points on an optically effective surface of the object in a coordinate system that is location-fixed with respect to the measuring station.

In particular, the system can also comprise a computer unit containing a computer program that calculates a location- and/or direction-dependent optical effect of the object from the topography of the first optically effective surface and from the data set containing the topography of the second optically effective surface taking account of a refractive index of the object.

Preferably, in the system there is a displacement unit for feeding an object to be measured into a measuring station and for transporting away an object that has been measured in the measuring station.

Preferably the displacement unit is an industrial robot, that is, a motion automaton having a plurality of axes, the movements of which with regard to movement sequence and distances or angles are programmable freely, that is, without manual intervention, and are preferably sensor-guided. For accommodating an object to be measured, the displacement unit has grippers.

The invention also encompasses a system comprising a computer unit for comparing a structure determined for an object or an optical effect determined for an object with desired values.

It is a concept of the invention, in particular, to use such a system for quality surveillance in a spectacle lens manufacturing device with which the deviation of the spatial structure of spectacle lenses from a desired value is compared.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
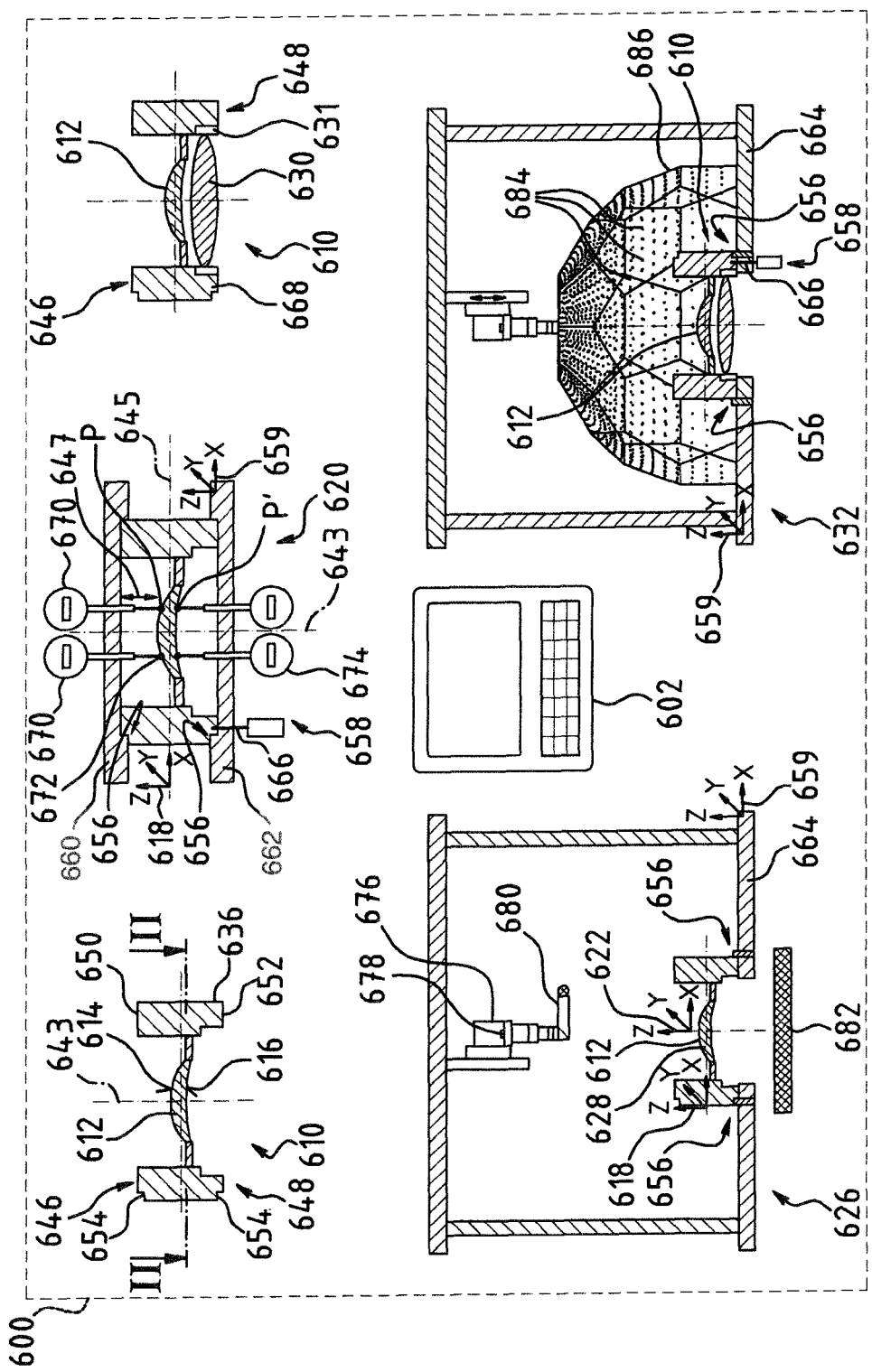
FIG. 1 shows a system for determining the spatial structure of a spectacle lens with a holding device and different measuring stations.

The system 600 shown in FIG. 1 serves for determining the spatial structure of a spectacle lens 612 accommodated in a holding device 610. The spectacle lens 612 has a glass body composed of a material that is transparent to the visible light. The glass body has a first, convex optically effective surface 614 and has a second optically effective surface 616, which is concave. In the present case, an optically effective surface of the glass body should be understood here to be a surface which reflects light impinging on the surface, preferably visible light, at least partly directionally.

It should be noted that, of course, spectacle lenses comprising a glass body in which the first or the second optically effective surface is arbitrarily curved or has no curvature at all can also be measured in the system 600.

It should be noted, however, that in principle, the spatial structure of an object which is different than a spectacle lens and which has a first and a second optically effective surface that reflect the light impinging on the surface at least partly directionally can also be measured in the system 600.

The system 600 comprises, besides the holding device 610, a first measuring station 620 for referencing the position of three points P on the first optically effective surface 614 and the position of three points P' on the second optically effective surface 616 in a coordinate system 618 that is location-fixed with respect to the holding device 610.

In the system 600 there is additionally a second measuring station 626 for referencing a Cartesian coordinate system 622 that is object-fixed with respect to the spectacle lens 612 with respect to the coordinate system 618 that is location-fixed with respect to the holding device 610. For this purpose, the measuring station 626 enables the measurement of the angular position of a marking 628 of the spectacle lens 612, the marking being arranged on the first optically effective surface 614 or the second optically effective surface 616. Furthermore, the system 600 contains a third measuring station 632 for ascertaining the topography of the first optically effective surface 614 and the second optically effective surface 616.

Besides a spectacle lens 612, the holding device 610 can additionally also accommodate a field lens 630 secured in a lens mount 631, which can be connected to a main body 636 of the holding device 610. The lens mount 631 is embodied in such a way that upon connection to the main body 636 of the holding device 610, the field lens 630 is arranged in a defined manner and is positioned uniquely in relation to the main body 636 of the holding device.

Figure 2:
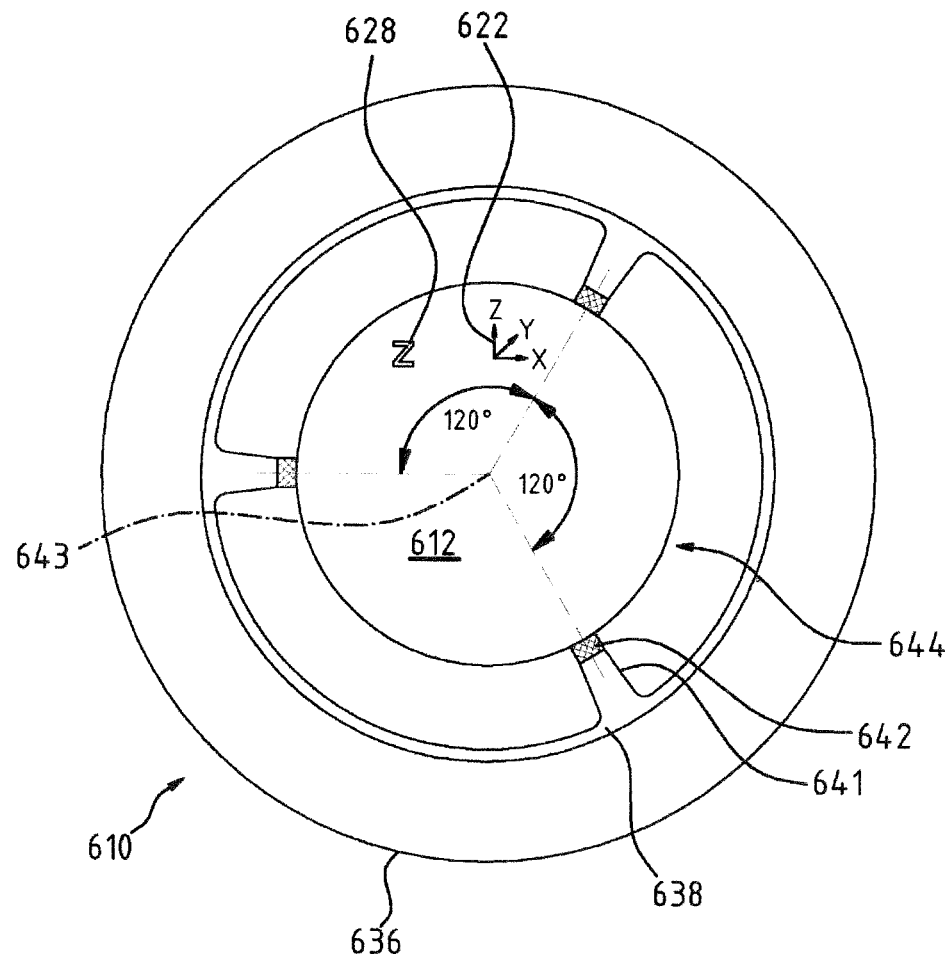
FIG. 2 shows the holding device as a sectional view in the system from FIG. 1 along the line II-II.

FIG. 2 shows the holding device 610 in the system 600 as a sectional view along the line II-II from FIG. 1. The main body 636 of the holding device 610 has a hollow-cylindrical form. The holding device 610 comprises a holding member 638—connected to the main body 636—for engaging around the lateral edge 644 of a spectacle lens 612 accommodated in the holding device 610.

The holding member 638 has a plurality of force-sensitive holding webs 641 with a contact body 642, which consists of an elastic material and which bears in each case against the lateral edge 644 of a spectacle lens 612 accommodated in the holding device 610. The holding webs 641 are arranged symmetrically with respect to the axis 643 of the main body 636. The holding webs 641 adjacent to one another form in each case the angle α=120°. It should be noted that in principle, four, five or even more holding webs with contact bodies accommodated thereon can also be provided in the holding device 610 in order to secure a spectacle lens 612.

The holding device 610 makes it possible to accommodate a spectacle lens 612 in such a way that the latter is not deformed by the holding forces. A spectacle lens 612 is fixedly held in the holding device 610, however, in such a way that the position of the spectacle lens 612 in a coordinate system 618 that is location-fixed with respect to the holding device 610 does not change during measurement in the system 600, even if the holding device 610 is moved from one measuring station in the system to another measuring station in the process and in particular is tilted and/or rotated in the process.

The contact bodies 642 in the holding device 610 are embodied as controllable contact bodies. By means of a suitable controller (not shown), it is possible here to set the hardness, the viscosity, the elasticity and/or the press-on force of the contact bodies 642 in the holding device 610.

The marking 628 on the optically effective surface 614 of the spectacle lens 612 serves as an orientation feature for the spectacle lens 612. The marking can be a permanent marking, in particular. On the basis of its geometry and/or on the basis of its position on the optically effective surface 614, the marking 628 defines the coordinate system 622 that is object-fixed with respect to the spectacle lens 612. It should be noted that the marking 628 in principle can be provided not only on an optically effective spectacle lens surface, but as an alternative thereto within the body of a spectacle lens.

As shown in FIG. 1, the main body 636 of the holding device 610 for a spectacle lens 612 has planar face surfaces (650, 652) at its face-side ends (646, 648). There are tooth members 654 at the face-side ends (646, 648), respectively, of the main body 636. In the present case, the tooth members 654 are each embodied as a cutout in the main body 636.

In the measuring stations 620, 626 and 632 there are complementary tooth members 656 for the tooth members 654 of the holding device 610. The complementary tooth members 656 in the first measuring station 620 are fashioned as tooth backs in a holding body (660, 662). By contrast, in the measuring stations 626 and 632, the complementary tooth members 656 are embodied as pins situated on a base body 664 of the measuring stations 626 and 632.

The measuring stations 620 and 632 additionally contain in each case a position detection device 658 for detecting the position of a holding device 610 with a spectacle lens 612, the holding device being arranged in the measuring stations. The position detection device 658 contains a tactile sensor having a displaceable measuring pin 666. There is a hole at the face-side end 648 of the main body 636 of the holding device 610. If the holding device 610 is situated in a measurement position in the measuring stations 620, 626 and 632, the tooth member of the holding device 610 is engaged with the complementary tooth member 656 on a holding body which is the base body 664 of the measuring stations 626 and 632. The measuring pin 666 of the device 658 for detecting the position of a holding device 610 arranged therein then either projects into the hole in the main body 636 of the holding device 610 or butts against the face surface 652 of the main body 636.

The tooth members 654 of the holding device 610 and the tooth members 656 complementary thereto and the position detection device 658 in the measuring stations 620, 626 and 632 are means for the reversibly definitive referencing of a coordinate system 618 that is location-fixed with respect to the holding device 610 with respect to a coordinate system 659 that is in each case location-fixed with respect to a base body 664 of the measuring stations 620, 626 and 632. The above-mentioned means for referencing define the relative position of the coordinate system 618 that is location-fixed with respect to the holding device 610 with respect to the coordinate system 659 of the measuring stations. They thus make it possible that if the position of points (P, P') on a spectacle lens 612 accommodated in a holding device 610 in a coordinate system 618 that is location-fixed with respect to the holding device 610 is known, the position of the points (P, P') in a coordinate system 659 that is location-fixed with respect to the base body 664 is inevitably also known in each of the measuring stations 620, 626 and 632 of the system 600.

In order, in the first measuring station 620 to ascertain the position of a point P on the first optically effective surface 614 of the spectacle lens 612 and the position of a point P' on the second optically effective surface 616 of the spectacle lens 612 in the coordinate system 618 that is location-fixed with respect to the holding device 610, the points (P, P') on the spectacle lens 612 can be scanned therein by being touched by means of tactile measuring probes (670, 674).

The measuring probes (670, 674) are referenced with respect to the holding bodies (660, 662) of the measuring station 620. They each have a measuring head 672 that is displaceable in the measuring station 620 in accordance with the double-headed arrow 647 in the direction of the axis 643 of the main body 636 of the holding device 610. On account of the above-explained means for referencing, the position of the measuring head 672 of a measuring probe 670 in the coordinate system 659 that is location-fixed with respect to the holding bodies (660, 662) of the holding device 610 can be detected here by means of the measuring probes 670. The measuring probes 670 in the measuring station 620 are arranged here such that the points (P, P') detected by the measuring heads 672 of the measuring probes 670 on the optically effective surfaces (614, 616) of the spectacle lens 612 are opposite one another and define a respective plane there.

The position of the measuring heads 672 of the measuring probes 670, on the one hand, and of the measuring probes 674 in a plane perpendicular to the axis 643, on the other hand, is identical in pairs in the measuring station 620, the plane being parallel to the plane 645. The measuring station 620 thus also makes it possible to ascertain the position of points (P, P') on the optically effective surfaces of the spectacle lens 612 by determining the thickness of the spectacle lens 612 at two points (P, P') opposite one another and combining the measured thickness with the position of the measuring head 672 of a measuring probe 670 on one of the optically effective surfaces of the spectacle lens 612 in the coordinate system 659 that is location-fixed with respect to the base body 664 of the measuring station 620.

The second measuring station 626 contains a camera 676 with an image sensor 678. The camera 676 is arranged in a manner displaceable in relation to the base body 664 of the measuring station 626. In this case, the position of the camera 676 in the coordinate system 659 that is location-fixed with respect to the base body 664 of the measuring station 626 is known. That is, that the camera 676 is uniquely referenced in every position with respect to the coordinate system 659. In the measuring station 626 there is a lighting unit 680 and a reflector 682. In the measuring station 626, therefore, a spectacle lens 612 arranged in the holding device 610 can be illuminated in such a way that the camera 676 can be used to detect the position of the marking 628 on the spectacle lens 612 in the coordinate system 659 that is location-fixed with respect to the base body 664 of the measuring station 626.

The third measuring station 632 for ascertaining the topography of the first and second optically effective surfaces (614, 616) in the system 600 has a multiplicity of point light sources 684 in the form of light-emitting diodes (LEDs) that are positioned on the lateral surface 686 of a polyhedron.

Figure 3A:
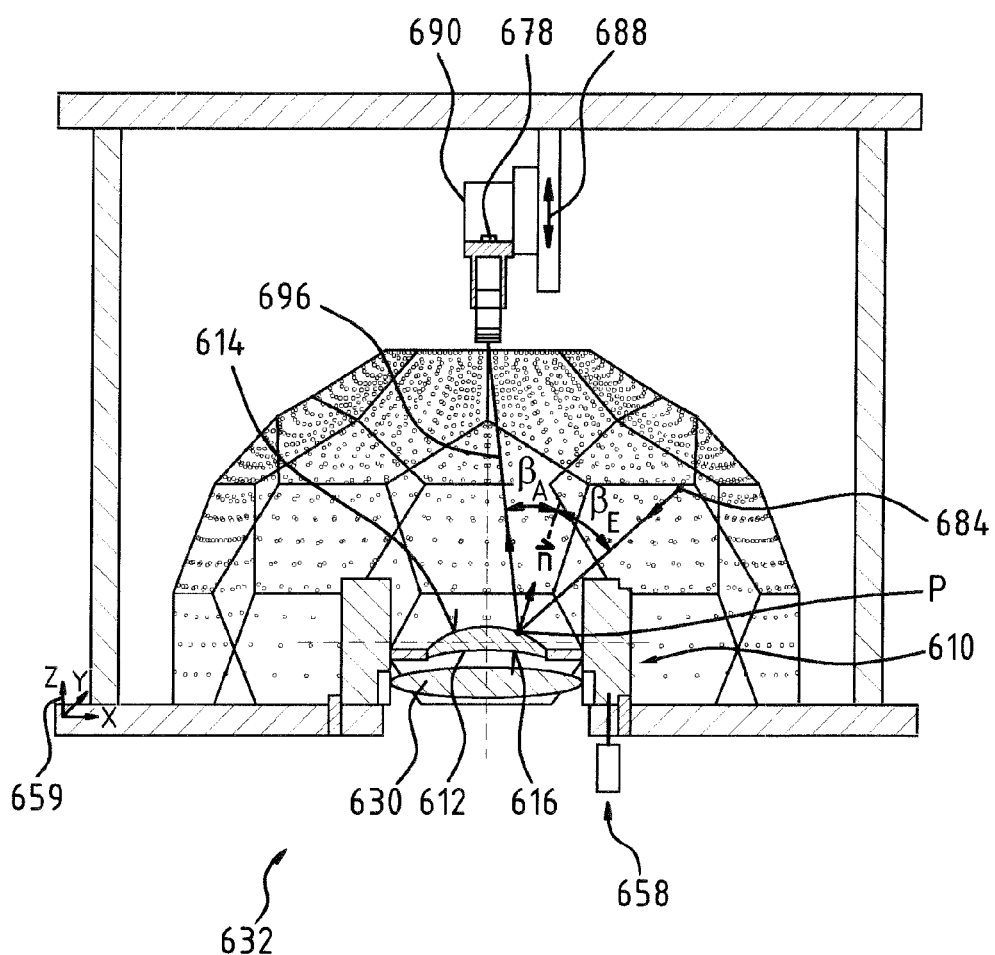
FIG. 3A shows a measuring station for ascertaining the topography of an optically effective surface of a spectacle lens in the system from FIG. 1 with a holding device arranged in a first measurement position.

FIG. 3A shows the measuring station 632 in an enlarged illustration. The holding device 610 with a spectacle lens 612 accommodated therein is arranged, in a first measurement position here. The measuring station 632 contains a camera 690 that is displaceable in the direction of the double-headed arrow 688 with an image sensor 678 for detecting a brightness distribution that is brought about on the image sensor 678 by the light of the point light sources 684 that is reflected at the optically effective surface 614 to be measured. The light from a point light source 684 passes with the light ray 696 onto the optically effective surface 614. At the point P having the coordinates ($X_S$, $Y_S$, $Z_S$), the light having the angle of incidence $\beta_E$ in relation to the surface normal $\vec{n}_p$ is reflected at the angle of reflection $\beta_A = \beta_E$ in accordance with the reflection law.

The brightness distribution on the image sensor 678 thus contains the information of the inclination of the tangential planes at the optically effective surface 614 to be measured of the spectacle lens 612 at those places at which the light of the point light sources 684 is reflected in such a way that it is captured by the camera 690.

The measuring station 632 comprises a computer unit (not shown) that functions as a device for activating the different point light sources 684 and for detecting and evaluating the brightness distribution arising on the image sensor 678 in the camera 690. For evaluating a brightness distribution detected by means of the image sensor 678 in the camera 690, there is a computer program in the computer unit. For a light ray 696—detected on the image sensor 678 by means of the camera 690—from a point P on the optically effective surface 614 of the spectacle lens 612 arranged in the measuring station 632 and the known positions of the point light sources 684 in the measuring station 632, the computer program calculates the surface normal $\vec{n}_p$ at the point. By means of integration and interpolation, the topography of the optically effective surface 614 is then calculated from a multiplicity of determined surface normals $\vec{n}_p$ in the computer program.

Figure 3B:
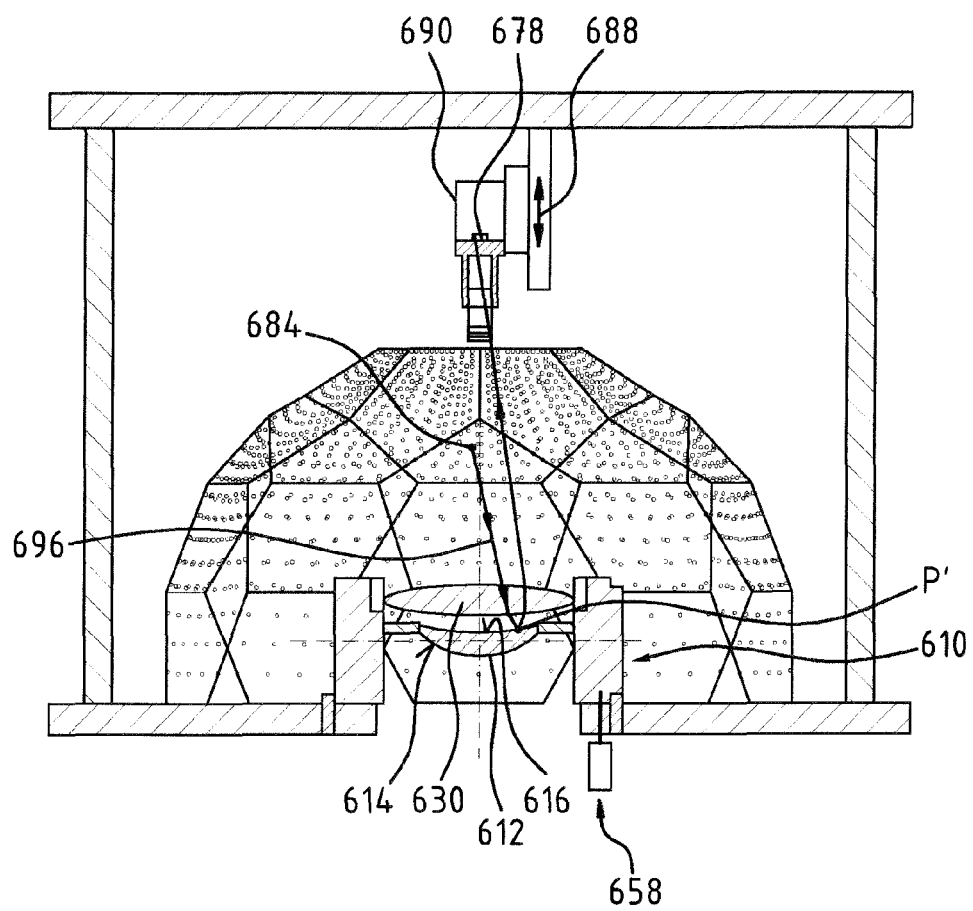
FIG. 3B shows the measuring station for ascertaining the topography of an optically effective surface of a spectacle lens in the system from FIG. 1 with a holding device arranged in a second measurement position.

The field lens 630 in the system 600 shown in FIG. 1 is an optical element having a positive refractive power. The field lens 630 is therefore a converging lens. In order to ascertain the topography of the concave optically effective surface 616 of the spectacle lens 612, the holding device 610 with the field lens 630 and a spectacle lens 612 accommodated therein is arranged in the measuring station 632 in the measurement position shown in FIG. 3B.

The field lens 630 here has the effect that the light of the point light sources 684 is directed to the optically effective surface 616 and the light reflected at this surface is in turn fed to the camera 690. Here once again for a light ray 696—detected on the image sensor 678 by means of the camera 690—from a point P' on the optically effective surface 616 of the spectacle lens 612 arranged in the measuring station 632 and the known positions of the point light sources 684 in the measuring station 632, the computer program of the measuring station 632 calculates the surface normal $\vec{n}_p$ at the point. By means of integration and interpolation, the topography of the optically effective surface 616 is then calculated in the computer unit of the measuring station 632 by means of the computer program.

In order to specify the spatial structure of a spectacle lens 612, the system 600 shown in FIG. 1 comprises a computer unit 602. The computer unit 602 contains a computer program that calculates the spatial structure of the spectacle lens 612 from the measurement data determined in the measuring stations 620, 626 and 632 for a spectacle lens 612. It should be noted that, in a modified configuration of the system 600 or modified operation of the system 600, provision can be made for only one of the surfaces (614, 616) of the spectacle lens to be measured in the measuring station 632 and for the topographical data with respect to the other surface to be input into the computer unit 602 because these data are known in the case of the corresponding spectacle lens.

Figure 4:
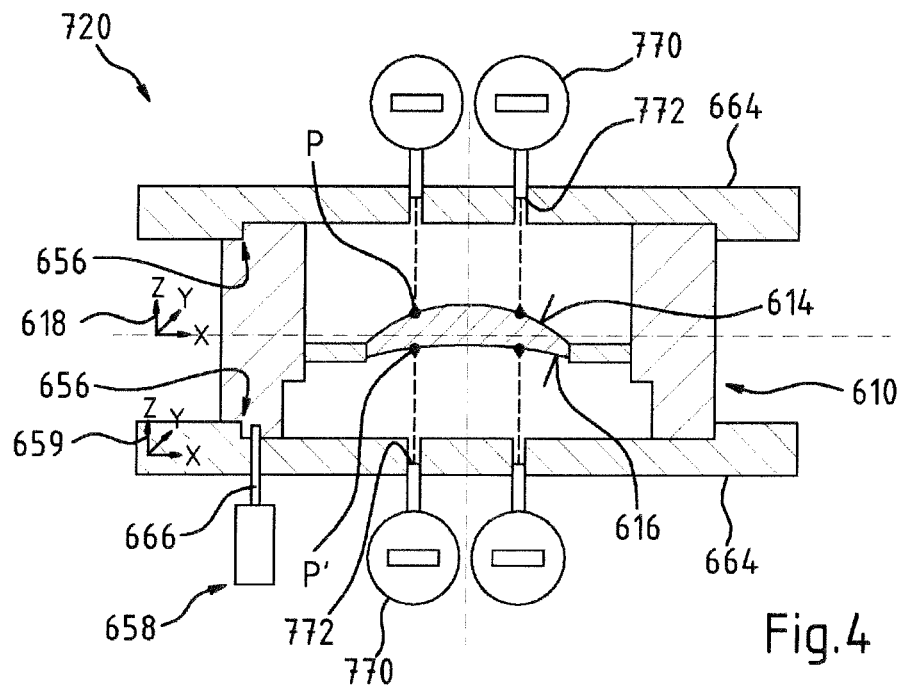
FIG. 4 shows a further, alternatively constructed measuring station for referencing two coordinate systems that are location-fixed with respect to the optically effective surfaces of a spectacle lens.

FIG. 4 shows a further measuring station 720—functionally corresponding to the measuring station 620—for referencing the position of a point P on the first optically effective surface 614 and a point P' on the second optically effective surface 616 in a coordinate system that is location-fixed with respect to the holding device 610. Insofar as the assemblies and elements shown in FIG. 1 and FIG. 4 are identical to one another, they are identified therein with the same numerals as reference signs.

In the measuring station 720 there are three optical distance measuring sensors 770 for scanning the optically effective surfaces (614, 616) of a spectacle lens 612. The distance measuring sensors 770 are used to ascertain the distance between a reference 772 of the distance measuring sensors 770 and a point (P, P') on one of the optically effective surfaces (614, 616) of the spectacle lens 612 by measurement of the optical path length between the point (P, P') and the respective reference. The points (P, P') on the first and second optically effective surfaces (614, 616) of the spectacle lens 612 as ascertained by means of the distance measurement define a respective plane here, too.

The position of the respective reference 772 of a distance measuring sensor 770 in a coordinate system 659 that is location-fixed with respect to the base body 664 of the measuring station 720 is known in the measuring station 720. The tooth members (654, 656) of holding device 610 and measuring station 720 that act as referencing means make it possible here, as in the measuring station 620 described above, that by ascertaining the position of the points (P, P') in the coordinate system 659 that is location-fixed with respect to the base body 664 of the measuring station 720, the position of the points (P, P') in the coordinate system 618 that is location-fixed with respect to the holding device 610 is also known.

Figure 5:
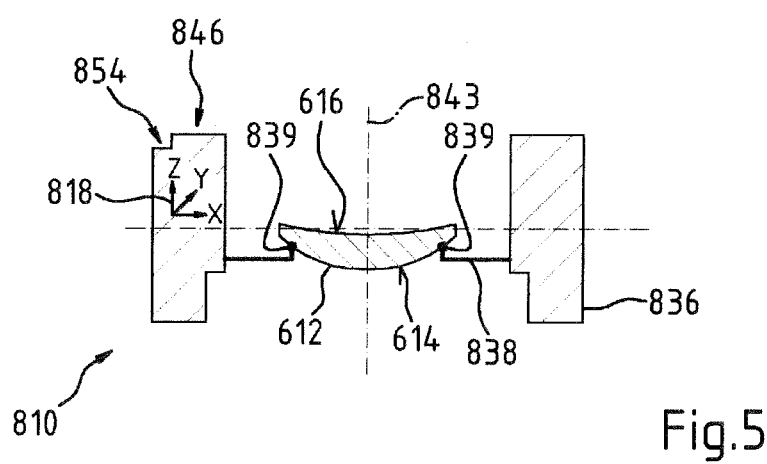
FIG. 5 shows a further, alternatively constructed holding device for use in a system for determining the spatial structure of a spectacle lens.

FIG. 5 shows a further holding device 810 for use in a system for determining the spatial structure of a spectacle lens 612. The holding device 810, too, has a hollow-cylindrical main body 836 and a holding member 838 connected to the main body 836, the holding member being embodied as a three-point support comprising ball bodies 839 (ball support).

Insofar as the construction and the function of the elements of the holding device 810 and of the holding device 610 described with reference to FIG. 1 and FIG. 2 correspond to one another, they are identified in FIG. 5 with numerals increased by the number 200 relative to FIG. 1 as reference signs. The holding device 810, too, is configured for accommodating an optical element in the form of a field lens which has a positive refractive power and can be arranged together with a spectacle lens 612 accommodated in the holding device 810 in a corresponding measuring station.

In the holding device 810, a spectacle lens 612 is positioned on a holding member 838 embodied as a three-point support and comprising three ball bodies 839, the position of which is uniquely referenced in a coordinate system 818 that is location-fixed with respect to the holding device 810. The position of the points (P, P') on an optically effective surface at which the optically effective surface touches the ball bodies 839 is thus known in the holding device 810.

Figure 6A:
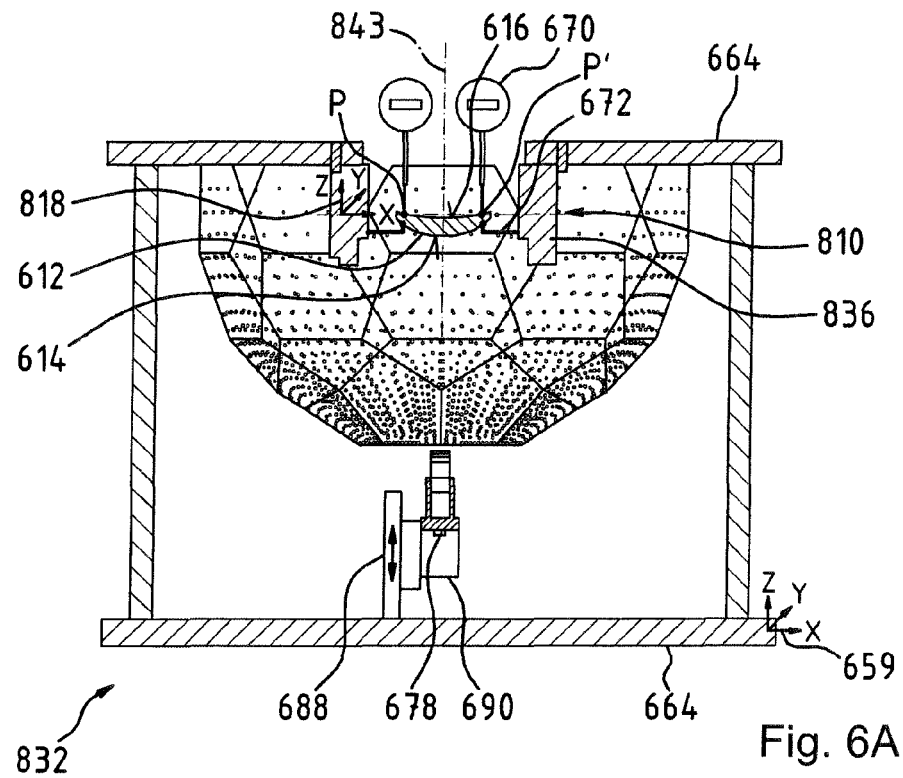
FIG. 6A shows a further, alternatively constructed measuring station for ascertaining the topography of an optically effective surface of a spectacle lens and referencing two coordinate systems that are location-fixed with respect to the optically effective surfaces of a spectacle lens in a system for determining the spatial structure of a spectacle lens, wherein the spectacle lens is situated in a first measurement position.

FIG. 6A shows a further measuring station 832 for use in a system for determining the spatial structure of a spectacle lens 612. Insofar as the assemblies of the measuring station 832 correspond to the assemblies of the measuring station 632 described above with reference to FIG. 3A and FIG. 3B, they are identified in FIG. 6A by the same reference signs as in FIG. 3A and FIG. 3B. The measuring station 832 contains a holding device 810 having a construction described above with reference to FIG. 5. In FIG. 6A, the spectacle lens 612 is shown in a measurement position allowing the topography of the optically effective surface 616 of the spectacle lens 612 to be ascertained. The measuring station 832 enables the referencing of three points (P, P') on an optically effective surface (614, 616) of the spectacle lens 612, the points being opposite the ball bodies 839.

Figure 6B:
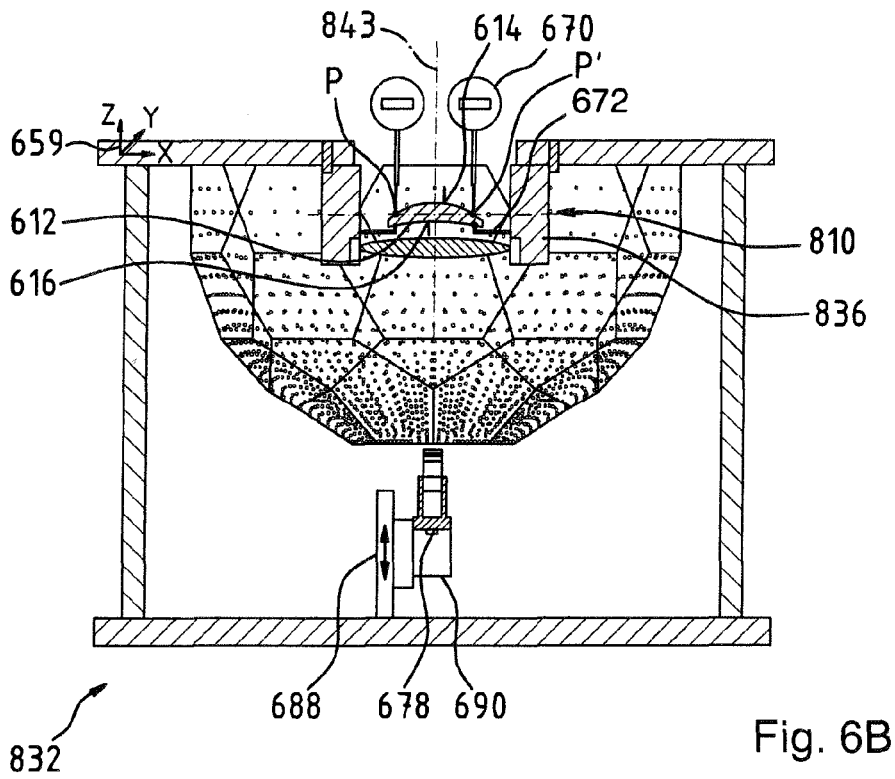
FIG. 6B shows the measuring station from FIG. 6A if the spectacle lens is arranged in a second measurement position.

FIG. 6B shows the measuring station 832 with a measurement position for the spectacle lens 612 that allows the topography of the optically effective surface 614 to be ascertained.

In the measuring station 832 there are measuring probes 670 having measuring heads 672 which are displaceable in the direction of the axis 843 of the main body 836 of the holding device 810. By means of the measuring probes 670, it is possible to detect the position of points P on an optically effective surface of a spectacle lens 612 in a coordinate system 659 that is location-fixed with respect to the measuring station 832 and thus also in a coordinate system 818 that is location-fixed with respect to the holding device 810, which points are opposite the points at which the spectacle lens 612 rests on the ball bodies 839 of the three-point support of the holding member 838.

The measuring station 832 is suitable in particular for measuring spectacle lenses 612 that are rotationally symmetrical with respect to the axis 843 of the main body 836 of the holding device 810. It should be noted, however, that, of course, non-rotationally symmetrical spectacle lenses can also be measured in the measuring station 832.

Furthermore, it should be noted that in the measuring station 832 optical distance measuring sensors can also be used in principle instead of the measuring probes 670 having the displaceable, tactile measuring heads 672, as has been described above with reference to FIG. 4.

Figure 7:
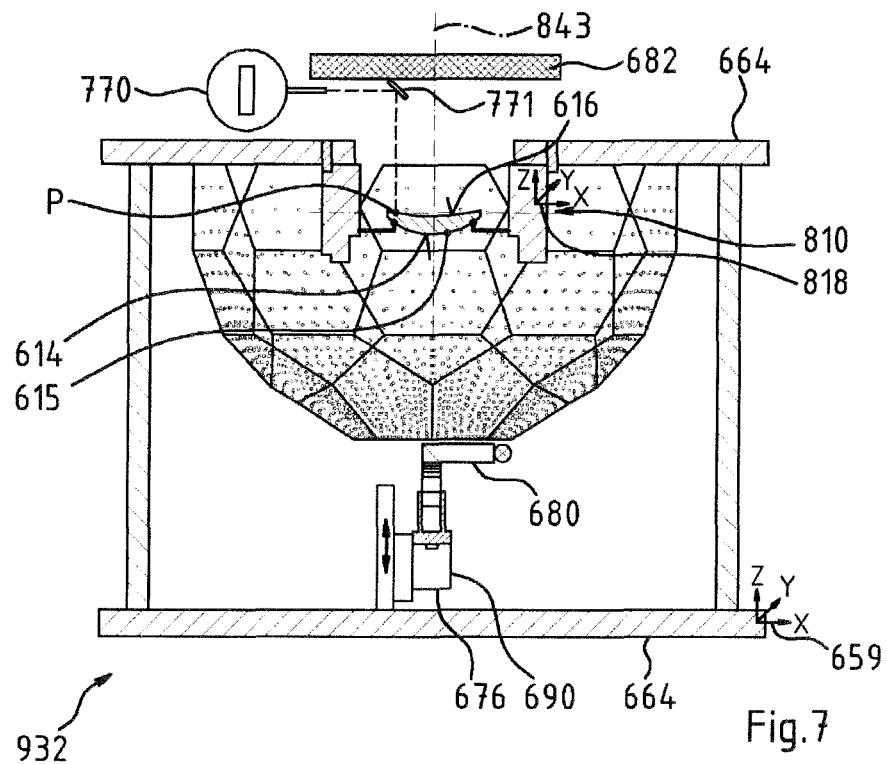
FIG. 7 shows a further, alternatively constructed measuring station for ascertaining the topography of an optically effective surface of a spectacle lens and referencing two coordinate systems that are location-fixed with respect to the optically effective surfaces of a spectacle lens in a system for determining the spatial structure of a spectacle lens.

FIG. 7 shows a measuring station 932 with a holding device 810 for ascertaining the topography of the optically effective surfaces 614 of a spectacle lens 612 and simultaneously referencing three points (P, P') opposite the ball bodies 839 on the optically effective surfaces (614, 616) of the spectacle lens 612 in a coordinate system 659 that is location-fixed with respect to the base body 664. Insofar as the assemblies of the measuring station 932 correspond to the assemblies of the measuring station 832 described above with reference to FIG. 6A and FIG. 6B, they are identified in FIG. 7 by the same reference signs as in FIG. 6A and FIG. 6B.

An optical distance measuring sensor 770 is integrated into the measuring station 932, the sensor comprising a mirror 771, which can be displaced in two different spatial directions in a plane perpendicular to the axis 843 of the holding device 810. As described above with reference to FIG. 4, it is thus possible to ascertain the position of points P on the optically effective surface 616 of the spectacle lens 612 in a coordinate system 659 that is location-fixed with respect to the base body 664 of the measuring station 932.

The measuring station 932 additionally contains a lighting unit 680 and a reflector 682. The camera 676 arranged in the measuring station 932 can thus also be used for ascertaining the angular position of a marking 615 arranged on an optically effective surface (614, 616), that is, for referencing a coordinate system that is object-fixed with respect to the spectacle lens 612 with respect to the coordinate system 659 that is location-fixed with respect to the base body 664.

In this way, the measuring station 932 makes it possible that all required measurements can be carried out therein on a spectacle lens 612 in order to determine the spatial structure for the spectacle lens. For this purpose, the spectacle lens 612 merely has to be measured in two different measurement positions in the measuring station 932. In order to displace the spectacle lens 612 from one measurement position to the other measurement position in the measuring station 932, it is merely necessary to turn the spectacle lens 612.

Figure 8:
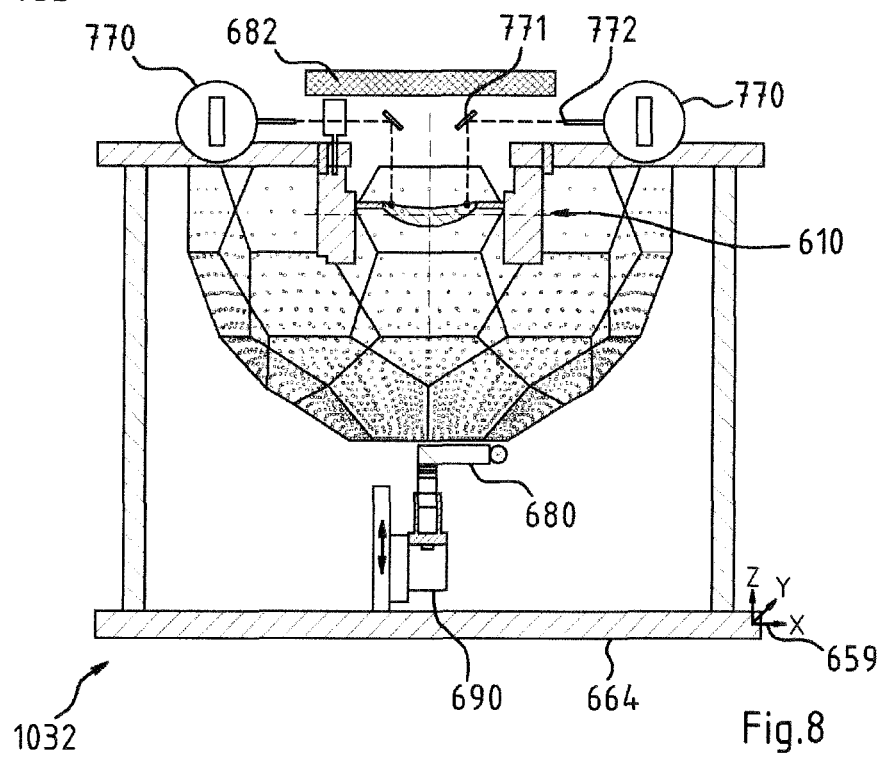
FIG. 8 and FIG. 9 in each case show further measuring stations for ascertaining the topography of an optically effective surface of a spectacle lens and referencing two coordinate systems that are location-fixed with respect to the optically effective surfaces of a spectacle lens in a system for determining the spatial structure of a spectacle lens; and, FIG. 10 shows a system for determining the location- and direction-dependent optical effect of a spectacle lens.

FIG. 8 shows a further measuring station 1032 with a holding device 610 for ascertaining the topography of the optically effective surfaces (614, 616) of a spectacle lens 612 and referencing in each case three points (P, P') arranged on the optically effective surfaces (614, 616) of the spectacle lens 612. Insofar as the assemblies of the measuring station 1032 correspond to the assemblies of the measuring station 632 described above with reference to FIG. 3A and FIG. 3B they are identified in FIG. 8 by the same reference signs as in FIG. 3A and FIG. 3B.

Optical distance measuring sensors 770 comprising a mirror 771 are integrated into the measuring station 1032 in order thus, as described above with reference to FIG. 7, to be able to ascertain on the optically effective surface 616 of the spectacle lens 612 three spatial points P' which define a plane and which are referenced with respect to the coordinate system 659 of the base body 664.

The measuring station 1032 additionally contains a lighting unit 680 and a reflector 682. The camera 690 arranged in the measuring station 1032 can thus also be used for ascertaining the angular position of a marking 615 arranged on an optically effective surface (614, 616) and thus for referencing a coordinate system that is object-fixed with respect to the spectacle lens 612 with respect to the coordinate system 659 that is location-fixed with respect to the base body 664.

In the measuring station 1032, too, all required measurements can thus be carried out on a spectacle lens 612 in order to determine the spatial structure thereof. For this purpose, the holding device 610 merely has to be turned once in the measuring station 1032.

Figure 9:
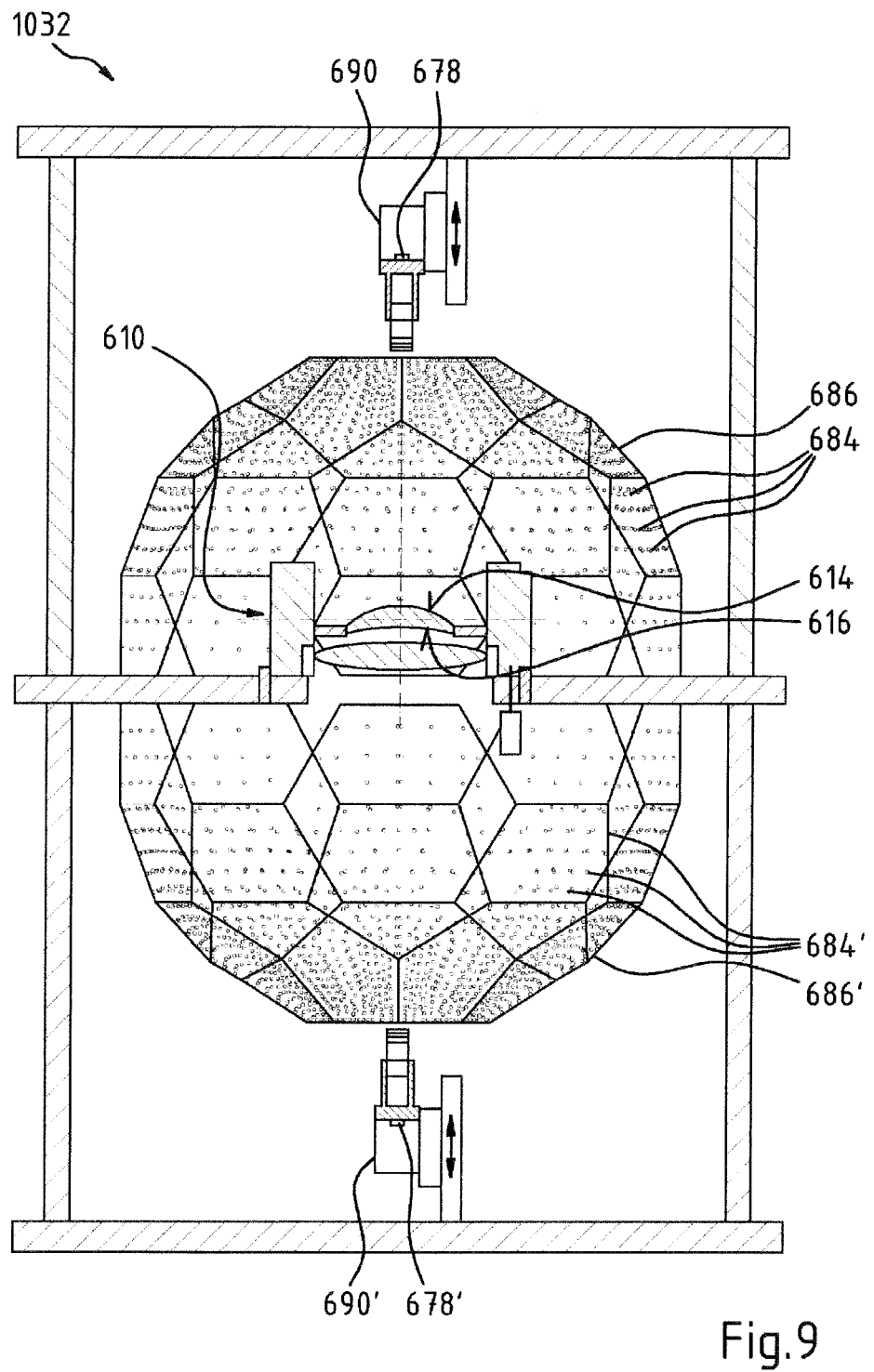

FIG. 9 shows a further measuring station 1132 with a holding device 610 for ascertaining the topography of the optically effective surfaces (614, 616) of a spectacle lens 612. Insofar as the assemblies of the measuring station 1132 correspond to the assemblies of the measuring station 632 described above with reference to FIG. 3A and FIG. 3B, they are identified in FIG. 9 by the same reference signs as in FIG. 3A and FIG. 3B.

In the measuring station 1132 it is possible to measure the optically effective surfaces (614, 616) of the spectacle lens 612 by means of a brightness distribution being detected on the image sensor 678 of the camera 690 and the image sensor 678' of the camera 690', the brightness distribution being detected from the light of the point light sources (684, 684') that is reflected at the optically effective surfaces (614, 616) to be measured, the point light sources being positioned on the lateral surface 686 of a first polyhedron and the lateral surface 686' of a second polyhedron.

FIG. 10 shows a system 1200 for determining the location- and direction-dependent optical effect of a spectacle lens 612. Insofar as the assemblies in the system 1200 correspond to the assemblies of the system 600 described with reference to the figures above, they are identified in FIG. 10 by the same reference signs as in FIG. 1.

The system 1200 contains a computer unit 1202 having an input unit 1204, which makes it possible to input the refractive index for the material of a spectacle lens 612 measured in the system 1200 and which receives from the measuring stations 620, 626 and 632 the data determined there with respect to the spectacle lens 612 with the information concerning the spatial spectacle lens structure.

The computer unit 1202 contains a computer program which, by means of a ray tracing method, from the data determined in the measuring stations 620, 626 and 632 and the refractive index for the spectacle lens material, calculates the optical effect of the spectacle lens both in a location-dependent manner and in a direction-dependent manner, that is, for example, the local curvatures of the spectacle lens and the local astigmatism thereof.

It is advantageous here if the computer program and the computer unit 1202 are configured in such a way that the refractive power of the spectacle lens can thereby be calculated with an accuracy of better than $1/100$ dpt.

Furthermore, it is advantageous, in one of the systems 600 or 1200 described above, to integrate a handling device—preferably embodied as an industrial robot—for moving the spectacle lenses between the different measuring stations and to provide there corresponding if possible robot-controlled systems for feeding the spectacle lenses into the measuring stations and removing them therefrom, which can contain in particular kinematic systems with suction units and/or grippers.

In particular, it is advantageous if the systems are combined with an RFID (radio frequency identification) device or a device for detecting 2D or 3D codes in order, for example, to take account of individual spectacle lens data stored on a spectacle lens carrier device in the systems.

The system 1200 described above is suitable in particular for monitoring the quality of spectacle lenses, spectacle lens semifinished products or spectacle lens blanks in a spectacle lens manufacturing device. Such a system makes it possible in principle, for example, to indicate the deviation of an envelope for the spectacle lens structure from an ideal form or to communicate these deviations to a processing station for a spectacle lens. In particular, it is possible, with such a system, to automatically segregate spectacle lenses which do not fulfill specific prescribed specifications. Furthermore, it is possible to print the location- and direction-dependent optical effect determined in the above-described system 1200 on a spectacle lens or to produce a corresponding label or a data sheet having this measurement information for a spectacle lens that is measured in the system 1200.

To summarize, in particular the following preferred features of the invention should be emphasized: in order to determine the spatial structure of an object, in particular a spectacle lens 612, a spectacle lens blank or a spectacle lens semifinished product, the object having a first optically effective surface 614 and a second optically effective surface 616, the following steps are carried out: the object 612 is arranged in a holding device (610, 810). The position of at least one point (P) on the first optically effective surface 614 and the position of at least one point (P') on the second optically effective surface 616 are referenced in a coordinate system that is location-fixed with respect to the holding device (610, 810). The topography of the first optically effective surface 614 of the object 612 is ascertained in a coordinate system 659 that is referenced on the basis of the position of the at least one point (P) on the first optically effective surface 614 with respect to the holding device (610, 810), and the spatial structure of the object 612 is calculated from the topography of the first optically effective surface 614 and from a data set concerning the topography of the second optically effective surface 616 the data set being referenced with respect to the location-fixed coordinate system (618, 818) of the holding device (610, 810) on the basis of the position of the at least one point (P') on the second optically effective surface 616.

It is understood that the foregoing description is that of the preferred embodiments of the invention and that various changes and modifications may be made thereto without departing from the spirit and scope of the invention as defined in the appended claims.

LIST OF REFERENCE SIGNS

600 System
602 Computer unit
610 Holding device
612 Spectacle lens
614 First optically effective surface
615 Marking
616 Second optically effective surface
618 Coordinate system
620 Measuring station
622 Coordinate system
626 Second measuring station 628 Marking
630 Field lens
631 Lens mount
632 Third measuring station
636 Hollow-cylindrical main body
638 Holding member
640 Lateral edge
641 Force-sensitive holding web
642 Contact body
643 Axis
644 Lateral edge
645 Perpendicular plane
646 Face-side end
647 Double-headed arrow
648 Face-side end
650, 652 Face surface
654 Tooth member
656 Complementary tooth members
658 Position detection device
659 Coordinate system
660 Holding body
662 Holding body
664 Base body
666 Displaceable measuring pin
668 Hole
670 Measuring probe
672 Measuring head
674 Measuring probe
676 Camera
678 Image sensor
678' Image sensor
680 Lighting unit
682 Reflector
684 Point light source
684' Point light source
686 Lateral surface
686' Lateral surface
688 Double-headed arrow
690 Camera
690' Camera
696 Light ray
720 Measuring station
770 Optical distance sensor/distance measuring device
771 Mirror
772 Reference
810 Holding device
818 Coordinate system
832 Measuring station
836 Main body
838 Holding member
839 Ball body
843 Axis
932 Measuring station
1032 Measuring station
1132 Measuring station
1200 System
1202 Computer unit
1204 Input unit

What is claimed is:

1. A method for determining the spatial structure of an optical element having a first optically effective surface and a second optically effective surface, the method comprising the steps of:
arranging the optical element in a holding device;
referencing the position of at least one point (P) on the first optically effective surface and the position of at least one point (P') on the second optically effective surface in a location-fixed coordinate system that is location-fixed with respect to the holding device;
determining the topography of the first optically effective surface of the optical element in a referenced coordinate system referenced with respect to the location-fixed coordinate system;
calculating the spatial structure of the optical element from the topography of the first optically effective surface and from a data set as to the topography of the second optically effective surface; said data set being referenced to the location-fixed coordinate system; and,
determining the topography of the first optically effective surface of the optical element in the referenced coordinate system by providing light from a multiplicity of point light sources with said light being reflected at the first optically effective surface in that a first brightness distribution is detected which is brought about on an image sensor by the light of the point light sources reflected at the first optically effective surface, and in that the topography of the first optically effective surface is calculated from the position of the at least one point (P) on the first optically effective surface of the optical element and from the detected first brightness distribution in the referenced coordinate system.

2. The method of claim 1, wherein the topography is determined from gradients and/or curvatures of the first optically effective surface.

3. The method of claim 1, wherein the data set as to the topography of the second optically effective surface is determined in that light is provided from a multiplicity of point light sources, said light being reflected at the second optically effective surface, in that a second brightness distribution is detected, which is brought about on the image sensor by the light of the point light sources reflected at the second optically effective surface and in that the topography of the second optically effective surface is calculated from the position of the at least one point (P') on the second optically effective surface of the optical element and from the detected second brightness distribution in the location-fixed coordinate system.

4. The method of claim 3, wherein the topography is determined from gradients and/or curvatures of the second optically effective surface.

5. The method of claim 1, wherein, for specifying the spatial structure of the optical element in an optical-element-fixed coordinate system, the location-fixed coordinate system is referenced to the optical-element-fixed coordinate system.

6. The method of claim 5, wherein the location-fixed coordinate system is referenced to the optical-element-fixed coordinate system by determining the position of a marking applied to the optical element.

7. The method of claim 1, wherein the position of the at least one point (P, P') on the first optically effective surface or on the second optically effective surface in the location-fixed coordinate system is determined by a thickness measurement of the optical element; and/or,
in that for referencing the position of the at least one point (P, P') on the first optically effective surface or the second optically effective surface in the location-fixed coordinate system, the optical element is measured by a distance measuring device relative to the holding device; and/or,
in that for referencing the position of the at least one point (P, P') on the first optically effective surface or the second optically effective surface in the location-fixed coordinate system, the optical element is accommodated at the at least one point (P) at a ball support in the holding device.

8. The method of claim 1, wherein said optical element is a lens including a spectacle lens, a spectacle lens blank and a spectacle lens semi-finished product.

9. A method for determining the location-dependent and direction-dependent optical effect of an optical element, said optical element having a first optically effective surface and a second optically effective surface, the method comprising the steps of:
- determining the spatial structure of the optical element with the following substeps:
  - (a) arranging the optical element in a holding device;
  - (b) referencing the position of at least one point (P) on the first optically effective surface and the position of at least one point (P') on the second optically effective surface in a location-fixed coordinate system that is location-fixed with respect to the holding device;
  - (c) determining the topography of the first optically effective surface of the optical element in a referenced coordinate system referenced with respect to the location-fixed coordinate system;
  - (d) calculating the spatial structure of the optical element from the topography of the first optically effective surface and from a data set as to the topography of the second optically effective surface; said data set being referenced to the location-fixed coordinate system; and,
  - (e) determining the topography of the first optically effective surface of the optical element in the referenced coordinate system by providing light from a multiplicity of point light sources with said light being reflected at the first optically effective surface in that a first brightness distribution is detected which is brought about on an image sensor by the light of the point light sources reflected at the first optically effective surface, and in that the topography of the first optically effective surface is calculated from the position of the at least one point (P) on the first optically effective surface of the optical element and from the detected first brightness distribution in the referenced coordinate system; and,
- calculating the location-dependent and direction-dependent optical effect of the optical element from the determined spatial structure of the optical element by a ray tracing method.

10. The method of claim 9, wherein, for specifying the spatial structure of the optical element in an optical-element-fixed coordinate system, the location-fixed coordinate system is referenced to the optical-element-fixed coordinate system.

11. The method of claim 10, wherein the location-fixed coordinate system is referenced to the optical-element-fixed coordinate system by determining the position of a marking applied to the optical element.

12. The method of claim 9, wherein the position of the at least one point (P, P') on the first optically effective surface or on the second optically effective surface in the location-fixed coordinate system is determined by a thickness measurement of the optical element; and/or,
in that for referencing the position of the at least one point (P, P') on the first optically effective surface or the second optically effective surface in the location-fixed coordinate system, the optical element is measured by a distance measuring device relative to the holding device; and/or,
in that for referencing the position of the at least one point (P, P') on the first optically effective surface or the second optically effective surface in the location-fixed coordinate system, the optical element is accommodated at the at least one point (P) at a ball support in the holding device.

13. The method of claim 9, wherein said optical element is a lens including a spectacle lens, a spectacle lens blank and a spectacle lens semi-finished product.

14. A system for determining the spatial structure of an optical element having a first optically effective surface and a second optically effective surface, the system comprising:
- a holding device for the optical element;
- a first measuring station for referencing the position of at least one point (P) on the first optically effective surface and the position of at least one point (P') on the second optically effective surface in a location-fixed coordinate system location-fixed with respect to the holding device;
- a second measuring station for determining the topography of the first optically effective surface of the optical element in a referenced coordinate system that is referenced to the location-fixed coordinate system;
- a computer unit having a non-transitory memory with a computer program stored therein;
- said computer program being configured to calculate the spatial structure of the optical element from the topography of the first optically effective surface and from a data set as to the topography of the second optically effective surface; said data set being referenced to the location-fixed coordinate system of the holding device;
- said second measuring station having a multiplicity of point light sources that provide light which is reflected at an optically effective surface to be measured of the optical element, the optical element being arranged in the holding device; and,
- said second measuring station including at least one camera for detecting a brightness distribution that is produced on an image sensor by the light of the point light sources that is reflected at the optically effective surface to be measured.

15. The system of claim 14, wherein the second measuring station determines the topography of the first optically effective surface by measuring the gradients and/or the curvature of the surface.

16. The system of claim 14, wherein the second measuring station is configured for measuring the topography of the second optically effective surface of the optical element in order to provide a data set as to the topography of the second optically effective surface of the optical element.

17. The system of claim 16, wherein the second measuring station is configured to determine the topography of the second optically effective surface by measuring the gradients and/or the curvatures of the surface.

18. The system of claim 14, wherein:
- the second measuring station has a multiplicity of point light sources that provide light which is reflected at the optically effective surface to be measured of the optical element arranged in the receiving region; and,
- the second measuring station contains at least one camera for detecting a brightness distribution that is produced on an image sensor by the light of the point light sources that is reflected at the optically effective surface to be measured.

19. The system of claim 18, wherein the holding device is configured for arranging the optical element in an accommodating region of the second measuring station, wherein the position of at least one point (P) on the first optically effective surface and of at least one point (P') on the second optically effective surface of the optical element in the location-fixed coordinate system can be determined in the holding device.

20. The system of claim 19, wherein the holding device with the optical element accommodated therein is arrangeable in the second measuring station in a first position, in which the first optically effective surface of the optical element faces the camera, and in a second position, which is different than the first position and in which the first optically effective surface of the optical element faces away from the camera.

21. The system of claim 14, further comprising:
a position detecting device for referencing the location-fixed coordinate system to a coordinate system that is location-fixed to the second measuring station; and/or,
the second measuring station having a camera for detecting the position of a marking arranged on the optical element in a coordinate system that is location-fixed with respect to the second measuring station; and/or,
said computer program being further configured to calculate a location-dependent and/or direction-dependent optical effect of the optical element from the topography of the first optically effective surface and from the data set as to the topography of the second optically effective surface taking account of a refractive index of the optical element; and/or,
an industrial robot for feeding the optical element to be measured into a measuring station and for transporting away the optical element measured in a measuring station; and/or,
a computer unit for comparing a structure determined for the optical element or an optical effect determined for the optical element with desired values.

22. The system of claim 14, wherein said optical element is a lens including a spectacle lens, a spectacle lens blank and a spectacle lens semi-finished product.

* * * * *